United States Patent [19]
Cucchi

[11] Patent Number: 5,860,340
[45] Date of Patent: Jan. 19, 1999

[54] DEVICE FOR GUIDING BARS TO A SPINDLE OF A MACHINE TOOL

[75] Inventor: Giovanni Cucchi, Bussero, Italy

[73] Assignee: Cucchi Giovanni & C. S.R.L., Bussero, Italy

[21] Appl. No.: 792,218

[22] Filed: Jan. 31, 1997

[51] Int. Cl.$^6$ ....................................................... B23B 5/14
[52] U.S. Cl. .............................. 82/127; 82/124; 82/126; 414/14
[58] Field of Search .............................. 82/124, 126, 127, 82/129; 414/14, 17, 753, 751, 749; 198/468.9, 468.1

[56] References Cited

U.S. PATENT DOCUMENTS

| | | |
|---|---|---|
| 4,292,864 | 10/1981 | Cucchi et al. . |
| 4,417,491 | 11/1983 | Uehara ...................................... 82/126 |
| 4,604,924 | 8/1986 | Cucchi et al. . |
| 4,664,002 | 5/1987 | Cucchi et al. ............................ 414/14 |
| 4,700,593 | 10/1987 | Cucchi . |
| 4,953,429 | 9/1990 | Arisaka et al. ........................... 82/127 |

*Primary Examiner*—Andrea L. Pitts
*Assistant Examiner*—Mark Williams
*Attorney, Agent, or Firm*—Young & Thompson

[57] ABSTRACT

A guide device for rotatably supporting and for guiding a bar to a spindle of a machine tool; the device comprises: a first and a second set of opposed jaws to receive and rotatably support a bar to be fed to the spindle of the machine; one set of jaws is rotatably journalled by support members to rotate between a closed and an open condition of the guide. Axially spaced apart support members are provided for removable journalling the first and the second set of jaws, and a square rod system longitudinally extending between adjacent support members to slidably engage each set of jaws, preventing rotation of the same jaws in respect to the support square rods. Removable shaft members are provided in the square rod system for rotatably journalling the supporting rods for movable jaws, and elastically biasing elements to rotate the square rods and the set of movable jaws towards the fixed set of jaws of the guide device.

8 Claims, 4 Drawing Sheets

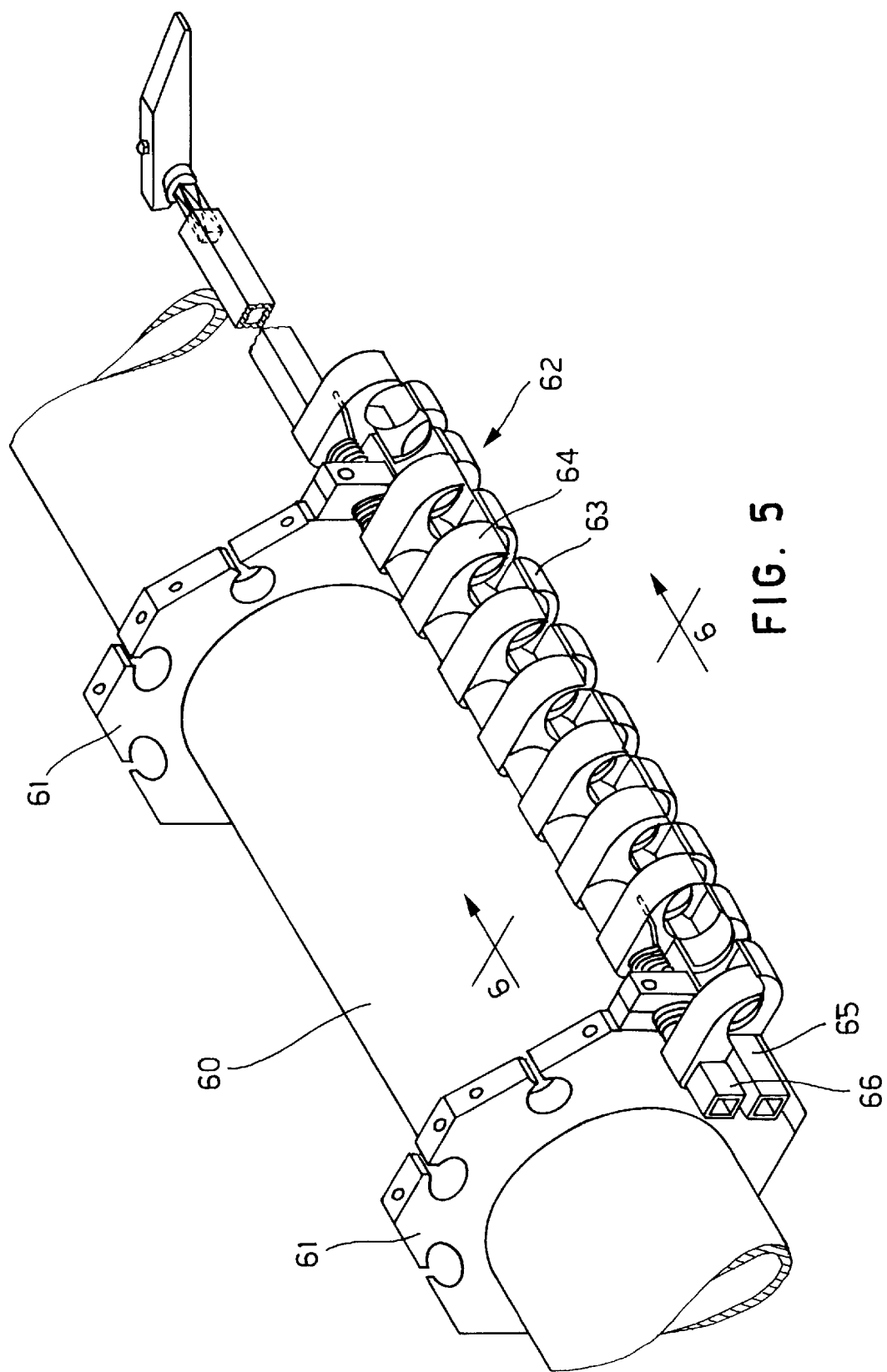

DEVICE FOR GUIDING BARS TO A SPINDLE OF A MACHINE TOOL

BACKGROUND OF THE INVENTION

The present invention relates to improvements to the automatic bar feeders for multi-spindle machine tools, and more particularly it relates to a guide device for rotatably supporting bars or elongated material to be fed to a spindle of such machines. The invention also concerns an automatic bar feeder of the rotatable drum type, normally used for selectively feeding bars to be machined by a multi-spindle machine tool.

Guide devices for bar feeders of the aforementioned kind, are described for example in the patents U.S. Pat. No. 4,604,924 and U.S. Pat. No. 4,700,593 or U.S. Pat. No. 4,292,864.

These guide devices generally comprise a first set of fixed jaws and a second set of movable jaws, co-operating to receive and rotatably support a bar to be fed to a spindle of a machine tool; the movable set of jaws of each guide are rotatably mounted to rotate between a closed condition and an open condition of the guide, during each working cycle of the machine tool. A bar-pushing member travels inside the guide jaws to move the bar forwards in correlation with the working cycle of the machine tool.

These guide devices have been previously proposed in substitution of the traditional tubular guides, in particular owing to the possibility of side loading the bars, as shown for example in FIG. 3 of the patent U.S. Pat. No. 4,292,864. However, these known guide devices in practice are subject to several problems resulting from the intrinsic difficulty of using them for supporting and guiding both bars of small diameter and bars of large diameter or having different cross-sectional dimensions; the specific structure of the guides itself, owing to the presence of a considerable number of hinges and connecting rods, does not allow easy assembly and rapid removal of the guides, sometime necessary for replacing the jaws and worn parts.

In fact, in the currently known guide devices, both the fixed jaws and the movable ones of each guide are fixedly connected to cylindrical rods which are fixed or hinged to support members arranged circumferentially and axially spaced on a rotatable central drum, to provide each guide device with the necessary structural continuity. The presence of several connecting rods and the considerable number of hinges results in considerable assembly and maintenance difficulties which, in the case of feeders of rotating-drum type, associated with machine tools operating at high-speed, or supplied with bars of large diameter, give rise to high noise levels as a result of the vibrations produced by the rapidly rotating bars. Finally, in bar feeders of the known type, the arrangement, in the space between adjacent guides, of the hinges and control levers which negatively effect the opening and closing movements of the guide, resulting in an extremely complicated structure and larger dimensions which considerably reduce the opening angle of the movable jaws of the guides, thus making it difficult, if not sometimes impossible, to load bars having large thickness.

OBJECTS OF THE INVENTION

The general object of the present invention is therefore to provide a guide device for feeding bars to a spindle of a machine tool, of the type suitable for allowing side loading of the bars, which is constructionally simple, having a small number of moving parts subject to vibrations and which, at the same time, allows easy assembly and rapid removal of the entire guide or of some worn parts thereof, without involving excessively long downtimes and consequent output loss.

A further object of the present invention is to provide a guide device of the kind mentioned above, particularly suitable for bar feeders of the rotary-drum type, which allows a wide opening movement of the guide for the loading also of bars having large thickness or cross-sectional dimensions and which at the same time has extremely small overall dimensions, proving to be particularly suitable for both small- and large-sized feeder drums.

A further object of the present invention is to provide a bar feeder of the rotating drum type, for multi-spindle machine tools which, in addition to being provided with guide devices according to the invention, is also provided with an extremely simple loading device for side loading of the bars, which has small overall dimensions and at the same time allows a bar loading operation to be performed in an extremely short time.

SUMMARY OF THE INVENTION

These and other objects of the invention may be achieved by means of a guide device and a bar feeder according to the invention.

In particular, according to a first embodiment of the invention, a guide device for rotatably supporting and for guiding bars to a spindle of a machine tool has been provided, the guide device having a longitudinal axis and comprising:

a first set of side-by-side arranged steady or fixed jaws and a second set of side-by-side movable jaws opposed to and co-operating with the first set of jaws to rotatably support a bar to be fed to the spindle of the machine; the set of movable jaws being rotatably supported to be moved between a closed and an open condition of the guide; and control means to rotate said movable set of jaws;

support means for removably supporting said first and said second set of jaws, along the guide device, said jaw support means comprising:

a plurality of axially spaced apart support members and a square rod system longitudinally extending between adjacent support members, each jaw having a passing-through square hole for slidably assembling and engaging with a respective square rod and stop means for preventing the sliding movement of the jaws at each end of the guide;

shaft means being provided for rotatably journalling the supporting square rods for the movable jaws, and elastically biasing means connected to the shaft means to rotate the supporting square rods and the movable jaws towards the fixed jaws of the guide device.

According to a further embodiment of the invention, a bar feeder for multi-spindle machine tools has been provided, of the type comprising:

a tubular drum having a longitudinal axis and support means to rotate the drum about the longitudinal axis;

a plurality of bar guide devices angularly spaced and longitudinally extending on the drum, each guide device in turn comprising:

a first set of side-by-side arranged fixed jaws and a second set of side-by-side arranged movable jaws co-operating with the first set of jaws to form a guide channel for receiving and rotatably supporting a bar to be fed to a respective spindle of the machine tool, the movable set of jaws in each guide device being rotatably supported to move between a closed and an open condition of the guide; said first and said second set of jaws being slidably assembled and engaged by respective square rods longitudinally extending with respect to the drum;

and support means for removably connecting said first and said second sets of jaws of each guide device, to the outer surface of the drum;

the feeder moreover comprising:

a first bar-pushing member longitudinally movable in each guide device, and drive means to move said pushing member between a retracted position where the pushing member is totally removed from the guide device and a totally advanced position towards the spindle of the machine tool;

a bar loading device, the loading device comprising in turn a channel element tiltably supported and parallely extending on one side of the feeder drum, a second bar-pushing member and control means for moving the second pushing member along the aforementioned channel element of the bar loading device;

and control means selectively actuable to laterally tilt both the first pushing member in said retracted position, and the bar loading device, between an aligned and an angularly spaced condition with respect to bar guiding channel of the bar guide device.

BRIEF DESCRIPTION OF THE DRAWINGS

These and other objects, features and advantages of the guide device and the bar feeder according to the present invention, will more clearly result from the description, with reference to the accompanying drawings, in which:

FIG. 5 is a perspective view of a second embodiment of a feeder according to the invention;

DETAILED DESCRIPTION OF THE INVENTION

With reference now to FIGS. 1 to 4, we shall describe a first embodiment of a bar guide device for a bar feeder according to the invention.

Figure 1:
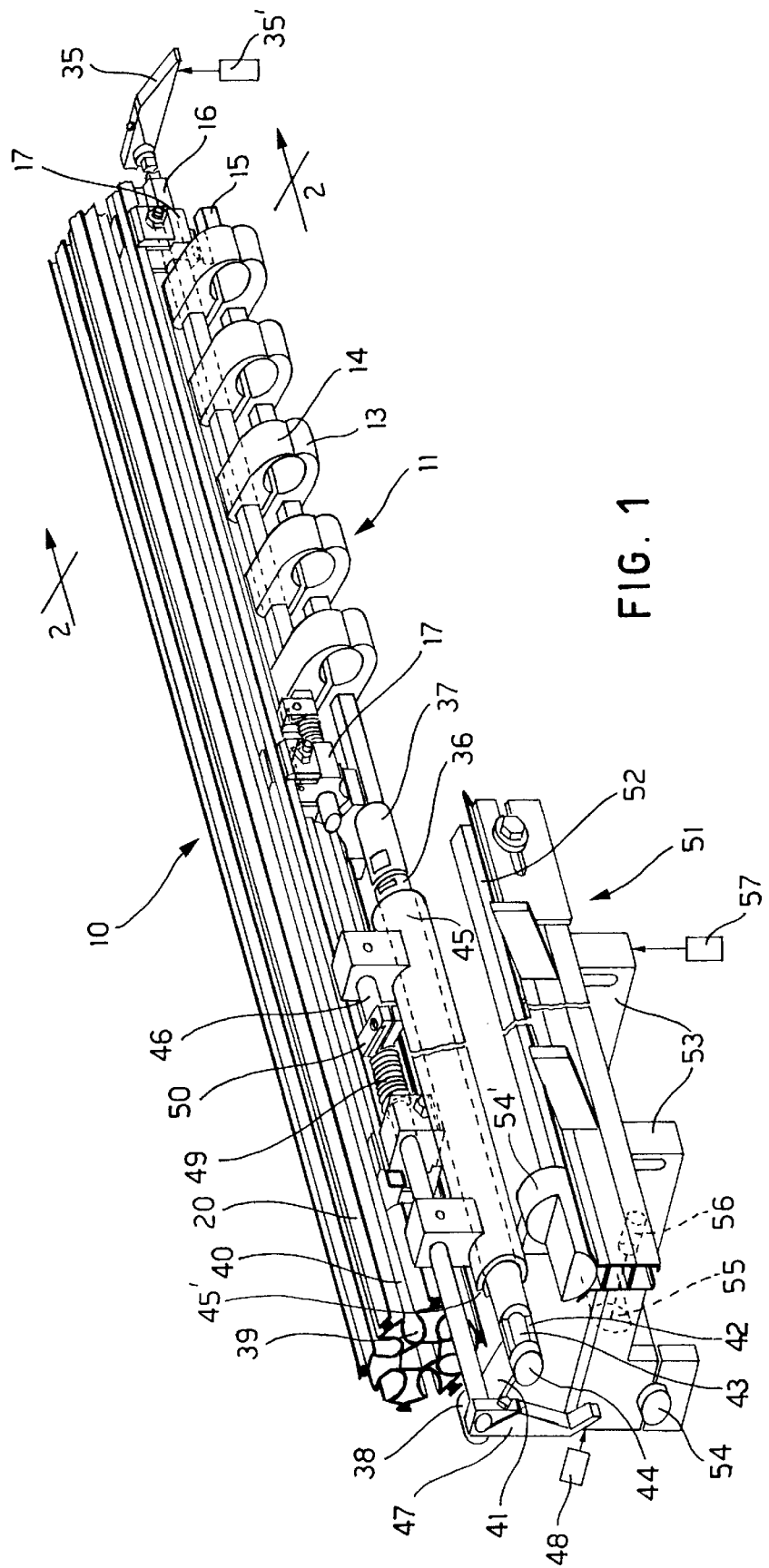
FIG. 1 is a perspective view of a first embodiment of a bar feeder, showing a single guide device according to the invention.

FIG. 1 shows, in schematic form, a prospective view of the essential parts of a bar feeder which substantially comprises a drum 10 suitably supported by a frame, not shown, for rotation about a horizontal axis of a machine tool coinciding with the longitudinal axis of the same drum.

The drum 10 is provided with a plurality of bar guide devices 11 for rotatably supporting and guiding bars to be fed to respective spindles of the machine tool.

Figure 2:
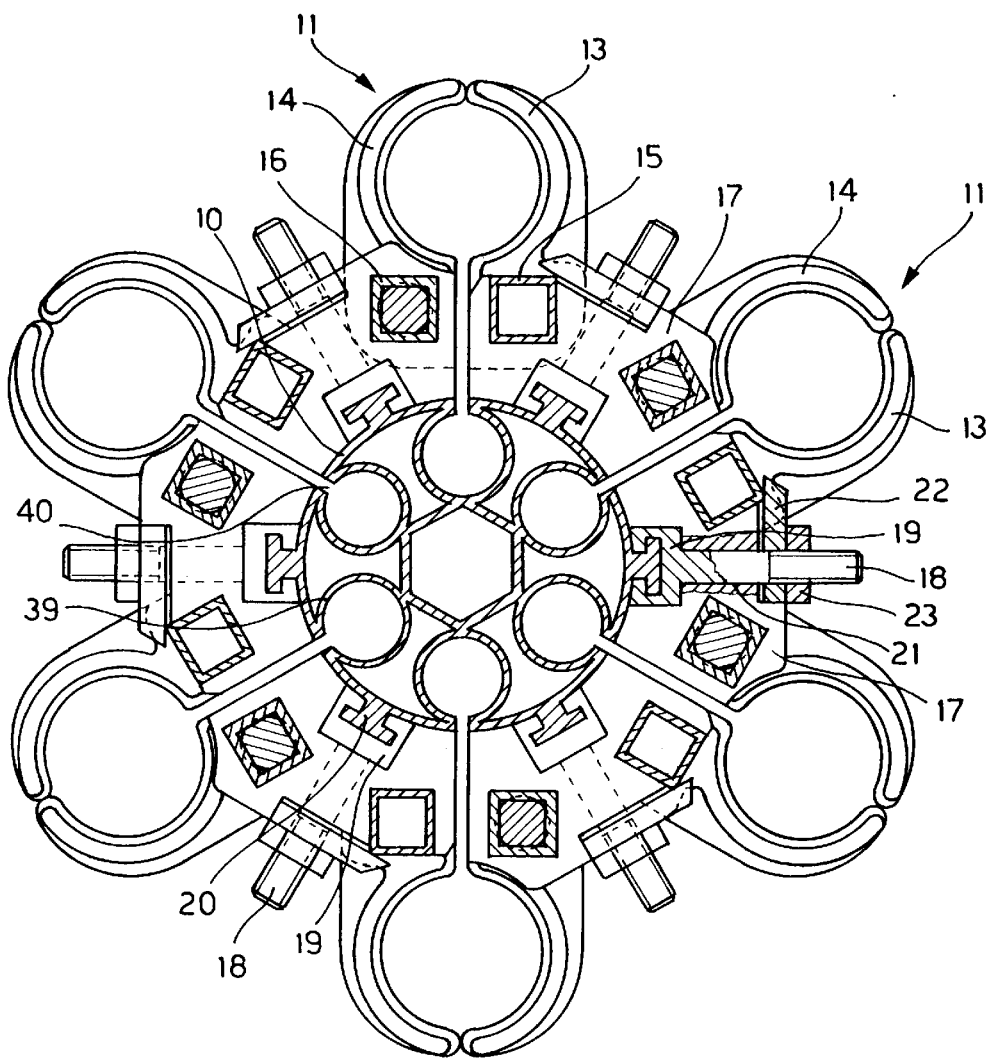
FIG. 2 is an enlarged cross-sectional view, along the line 2—2 of FIG. 1.

More precisely, as shown in the sectional view of FIG. 2, the drum 10 is provided with six bar guide devices 11 which are angularly spaced apart from one another, for serving corresponding spindles of the machine tool with which the feeder is operationally associated. According to this first embodiment of the invention, each guide device 11 comprises a first set of fixed jaws 13 side-by-side aligned in the longitudinal direction of the drum, and a second set of movable jaws 14 side-by-side arranged and opposed to said first set; the jaws 13 and 14 have a semi-circular shaped end portion to define a tubular guide channel for the bars, which laterally extends with respect to square rods or tubular members 15 and 16 on which the jaws 13 and 14 are removably fitted, as explained further below.

The bar-guide devices 11 are removably supported by the drum 10 in angularly spaced apart positions by a plurality of support members 17 circumferentially arranged at several axially spaced points of the drum 10.

Figure 4:
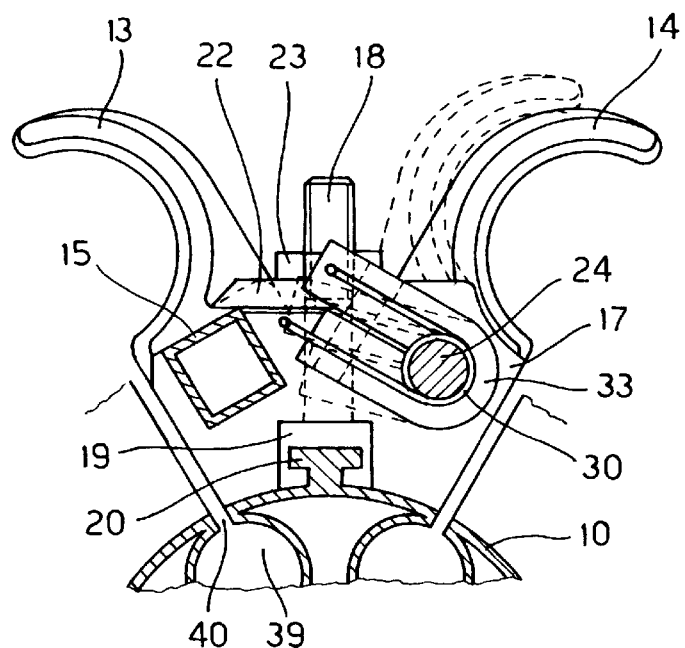
FIG. 4 is an enlarged detail, of a jaw-supporting member of the guide device according to FIG. 1.

As shown in FIGS. 2 and 4, each support member 17 is used to support the set of the fixed jaws 13 of a guide device, as well as the set of the movable jaws 14 of an adjacent guide device; moreover, each support member 17, is in the form of an arch shaped sector member removably fastened to the drum 10 by disengageable locking means to allow easy assembly and rapid removal of each guide device, or part thereof, without having to remove or carry out particular operations on the entire feeder.

In particular, in the example of FIGS. 2 and 4, each guide-support member 17 is removably fixed to the drum 10 by a bolt 18 having a C-shaped head 19 which engages with a T-shaped rib 20 longitudinally extending on the external surface of the drum 10; the threaded shank of the bolt 18 is extending through a hole 21 in the support member 17, protruding beyond the external edge.

Each support member 17 is in turn provided, on one side, with a U-shaped seat 17', for housing a tubular square rod 15 for supporting the fixed jaws 13, while on the opposite side the above support member 17 is provided with a circular hole 17" (see FIG. 3) for a rotational shaft of the movable jaws 14, as explained further below.

Each square rod 15 for supporting the fixed set of jaws, is removably fitted into a U-shaped seat of each support member 17, and retained by means of a small keep plate 22 and a nut 23 screwed onto the threaded shank of the bolt 18; at the same time, the nut 23 and the bolt 18 firmly lock the support member 17 to a rib 20 of the drum 10.

Already from that stated above, it is evident that the entire set of jaws 13 of each guide device, or the guide devices themselves, may be removed or assembled by simply acting on the locking means 18, 23; moreover, as regards that stated further below with reference to FIG. 3, the jaws 13 and 14 of each guide device may in turn be assembled and/or removed by means of simple sliding along the support rods 15 and 16.

This solution is therefore extremely advantageous when compared to the previously known bar guide devices, since, because in addition to allowing separate assembly and removal of the fixed guiding jaws 13, with respect to the movable set of guiding jaws, it also allows easy alignment of the jaws themselves of each set, separately for each guide device of the feeder.

Figure 3:
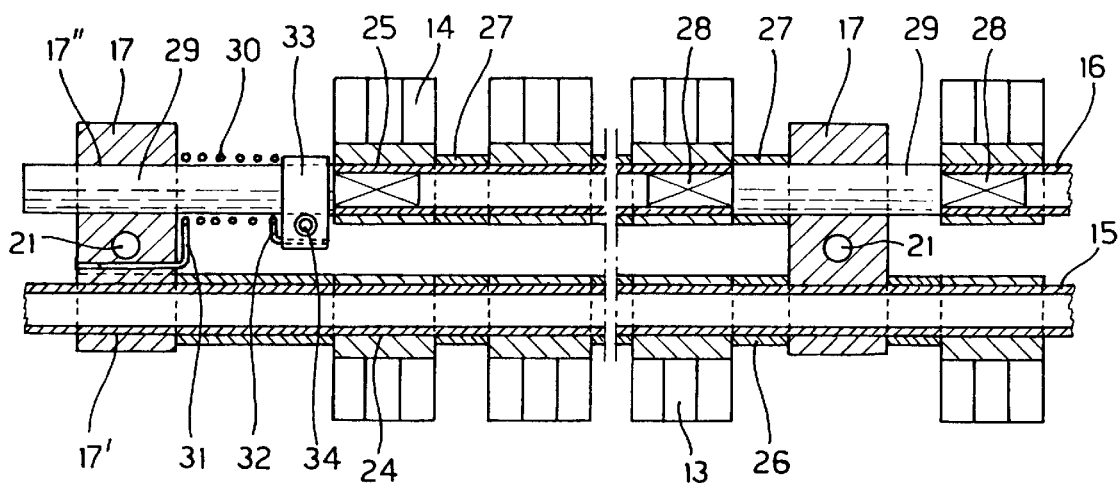
FIG. 3 is a longitudinal sectional view through the guide device according to FIG. 1.

More precisely, as shown by way of example in FIGS. 2 and 3, each fixed jaw 13 and correspondingly each movable jaw 14 has at its rear end portion a square hole 24 and 25, respectively, by means of which the jaw may be simply inserted and made to slide along a respective square rod 15, 16 until it is brought into the desired position, stopping against a spacer 26, 27 which keeps the jaw stopped in a predetermined position with respect to a support member 17 or an adjacent jaw.

As mentioned above, the set of movable jaws 14 of each guide device 11 may be rotated and moved between a closed condition of the guide and an open position for side loading of bars.

In this connection, as shown in FIG. 3, in the region of each support member 17, each of the square tubular rods 16 located on the sides of the support member 17 engages with a corresponding square end 28 of a shaft 29 inserted beforehand through the corresponding hole 17" of the support element 17; since the square ends of each individual journal shaft are simply inserted into corresponding tubular rods 16, and since both the fixed and the movable jaws are correspondingly supported by square rods, consequently the entire assembly of each guide may be easily assembled, removed and disassembled in an extremely rapid and simple manner, without having to carry out operations on the entire feeder. Locking in the axial direction of the movable jaws 14 and journal shafts 29 may be performed with any suitable means, for example by the same springs 30 provided at both ends of each guide device, which act to cause the closing rotational movement of the movable set of jaws 14 towards the fixed set of jaws 13 of the same guide device.

In this connection, each biasing spring 30 is in the form of a spring spirally arranged coaxially with the shaft 29, so that one end 31 of the spring is fitted into a hole of a guide support element 17, while the other end 32 of the spring is fitted into a corresponding hole of a U-shaped clamp 33 adjustably fixed to the shaft 29 by tightening a screw 34; in this way, slackening the clamping force by turning the screw 34, it is possible to adjust the biasing force exerted by the spring 30 by simply rotating the clamp 33 angularly adjusting the same and locking it again to the shaft 29 by tightening the screw 34 in the desired angular position. The above is illustrated by means of continuous lines and dotted lines in the view shown in FIG. 4.

It has already been said that the set of movable jaws 14 of each guide device is able to rotate between a closed condition, shown in FIG. 1, and an open condition of the guide shown in dotted lines in FIG. 4, so as to allow opening of the guide and side loading of a new bar which must be fed to a spindle of a machine tool; actuation of the rotational movement of the set of jaws 14 for opening the guide may be obtained in any manner, for example by a lever 35 at one end of the guide device 11 on which a cam or an actuating device 35' acts during rotation of the drum 10, as schematically shown in FIG. 1.

The bars to be fed to the spindle of the machine tool, once charged into the guide device 11, must be moved forwards by steps of a predetermined length, into the respective spindle of the machine tool; in this connection, the guide device 11 is provided with a first pushing member consisting of a sliding pushing rod 36 provided with a rotating head 37 in which, the rear end of a bar which must be made to advance along the guide device may be fitted. Therefore, the pushing rod 36, in the axially aligned condition with the corresponding guide 11, should be moved longitudinally between a totally retracted condition, shown in FIG. 1, where the pushing rod 36 is removed from the guide 11 so as to allow opening thereof and side loading of a bar, and a fully advanced position towards the respective spindle of the machine tool.

Driving of the pushing rod 36 may be performed using any suitable drive means, for example by an endless chain which extends along the drum 10 and is connected to a cylindrical piece 38 sliding along a tubular guide channel 39 inside the drum 10. Each tubular guide 39 opens out on the side surface of the drum 10 by a longitudinal slit 40 having, passing through it, a plate 41 connected to the drive piece 38; the plate 41 in turn terminates in a semi-cylindrical fork member 42 which may be disengageably connected with a shank 43 end a head-piece 44 at the rear end of the sliding rod 36. Each transmission chain is driven selectively by a respective drive motor or by a gearing or in any other known manner, not shown since it does not form an essential feature of the present invention.

Disengagement of the pushing rod 36 and the drive device 42, in a bar feeder according to the invention, is required in order to tilt the pushing rod 36 laterally each time the guide must be opened for loading of a bar. Therefore, at the rear end of the drum 10, in a predetermined angular position of the feeder, corresponding to the bar loading position, control means have been provided, which are selectively actuable in order to tilt the pushing rod 36 laterally, whenever the latter is in its retracted position shown in FIG. 1, moving it between a condition in which the pushing rod is aligned with a respective guide device 11 and a position angularly spaced apart therefrom.

In this connection, at the rear of the guide device 11, there is provided a tubular sleeve 45 having a length less than the pushing rod 36 to accomodate the latter; the sleeve 45 is pivotally supported by the structure of the feeder so as to rotate about a horizontal axis 46 parallel to the longitudinal axis of the drum 10. The axis 46 is connected to a lever 47 which, during rotation of the drum 10, may be actuated by a cam or by an actuating device 48; a helical spring 49 connected to an adjustable clamp 50 fixed onto the shaft 46 acts to rotate the sleeve 45 and keep it in the condition aligned with the guide 11, as shown in FIG. 1. The sleeve 45, on the side of the drum 10, is moreover provided with a longitudinal slit 45' through which the plate 41 slides during longitudinal travel of the pushing rod 36; therefore the pushing rod 36 may be engaged with and disengaged from the fork member 42 of the drive device by a simple lateral tilting movement of the support sleeve 45.

In FIG. 1, finally, 51 denotes in its entirety a device for side loading of the bars. The loading device 51 substantially comprises an open top channel member 52 supported by arms 53 so as to tilt about a horizontal rotational axis 54 which extends in a parallel manner below the sleeve 45.

The channel member 52, which has the function of slidably supporting each bar during the loading stage, has travelling along it a second pushing member 54' which, similar to the pushing rod 36, is moved by a chain transmission system 55 actuated by a respective drive motor 56; the movement involving raising of the channel member 52, from the position shown in FIG. 1 where it is angularly spaced from the guide 11, to a condition aligned with the guide itself, may be obtained in any manner, for example by means of the drive means schematically indicated by 57.

FIGS. 1 to 4 relate a first embodiment of the invention, particularly suitable for a bar feeder intended to be associated with a small-size or rapid-operation machine tool. In the case of eight-spindle or larger size machine tools, for which the weight of the drum and the guides may be less critical, it is possible to use the solution shown in FIGS. 5 and 6; this solution, while possessing all the features of the preceding guide device, has the additional advantage to allow separate assembly and disassembly of the movable jaws and the fixed jaws of a same guide device, without removal of the support members which may therefore be of different type, rigidly fixed to the drum.

Figure 6:
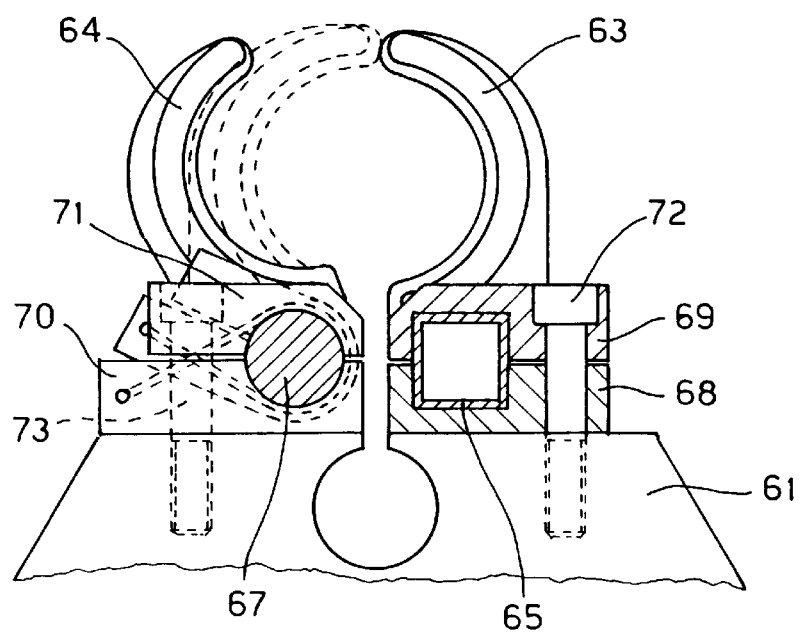
FIG. 6 is an enlarged detail, of FIG. 5.

In short, in FIGS. 5 and 6, the reference number 60 schematically denotes a tubular drum of the feeder, while 61 denotes octagonally shaped support member for a corresponding number of guide devices 62, only one of which has been shown in FIG. 5.

In a manner similar or analogous to that of the preceding embodiment, in this case also the guide device 62 comprises a plurality of steady or fixed jaws 63 arranged side-by-side and aligned in the longitudinal direction of the drum 60, and a plurality of movable jaws 64 arranged opposite to the fixed jaws and laterally offset with respect thereto.

Both the fixed jaws 63 and the movable jaws 64 are supported by respective square rods 65 and 66, with the jaws 63, 64 being connected to said square rods as previously described and shown or in a similar manner. In this second case, both the square rods 65 associated with the fixed jaws 63 and the shafts 67 for the square rods 66 of the movable jaws 64, are retained on the support members 61 by shaped blocks 68, 69 and 70, 71, which are in turn fixed to the support members 61 by means of the screws 72 and 73; in this way, both the set of fixed jaws 63 and the set of movable jaws 64 of each guide device may be assembled, disassembled and removed in an entirely independent manner, without removing the support members 61.

What is claimed is:

1. A guide device for rotatably supporting and guiding bars to a spindle of a machine, the guide device having a longitudinal axis and comprising:

a first set of side-by-side fixed jaws and a second set of side-by-side movable jaws opposed to and co-operating with the first set of jaws to rotatably support a bar to be fed to the spindle of the machine; the set of movable jaws being rotatably supported to be moved between a closed and an open condition of the guide; and control means to rotate said movable set of jaws;

jaw support means for removably supporting said first and said second set of jaws, along the guide device, said jaw support means comprising:

a plurality of axially spaced apart support members and a square rod system longitudinally extending between adjacent support members, each jaw having a passing-through square hole for slidably assembling and engaging with a respective square rod of said square rod system and stop means for preventing the sliding movement of the jaws at each end of the guide;

shaft means being provided for rotatably journalling the square rods for the movable jaws, and elastically biasing means connected to the shaft means to rotate the square rods and the movable jaws towards the fixed jaws of the guide device.

2. A guide device according to claim 1, wherein the shaft means comprise a shaft rotatably supported and extending through a hole into a respective support member, said shaft having at least one square shaped end portion removably inserted into a corresponding hollow end of a square rod for supporting the movable jaws.

3. A guide device according to claim 1, wherein each support member comprises an open seat for supporting a square rod of the fixed jaws, and wherein a retaining plate for the square rod is partially extending over said open seat, and is removably fixed to the support member by a locking bolt.

4. A guide device according to claim 3, wherein said bolt has a C-shaped looking head longitudinally sliding and engaging, with a retaining rib of the guide device.

5. A guide device according to claim 1, wherein the elastically biasing means comprise a helical spring coaxially arranged to the shaft means, one end of the spring being connected to a respective support member, the other end of the spring being connected to a fastening clamp and means for rotatably and adjustably connecting said fastening clamp to a respective shaft of the square rods.

6. A guide device according to claim 1, wherein the square rods of the fixed set of jaws and the shafts for rotation of the square rods of the movable set of jaws are journalled on the support members by shaped blocks removably fixed along the peripheral edges of the support members.

7. A bar feeder for a multiple-spindle machine tool, of the type comprising:

a tubular drum having a longitudinal axis and drive means to rotate the drum about the longitudinal axis;

a plurality of bar guide devices angularly spaced and longitudinally extending on the drum, each guide device in turn comprising:

a first set of side-by-side arranged fixed jaws and a second set of side-by-side arranged movable jaws co-operating with the first set of jaws to form a guide channel for receiving and rotatably supporting a bar to be fed to a respective spindle of the machine tool, the movable set of jaws in each guide device being rotatably supported to move between a closed and an open condition of the guide; said first and said second set of jaws being slidably assembled and engaged by respective square rods longitudinally extending with respect to the drum;

and support means for removably connecting said first and said second sets of jaws of each guide device, to the outer surface of the drum;

the feeder moreover comprising:

a first bar-pushing member longitudinally movable in each guide device, and drive means to move said pushing member between a retracted position where the pushing member is totally removed from the guide device and a totally advanced position towards the spindle of the machine tool;

a bar loading device, the loading device comprising in turn a channel element tiltably supported and parallely extending on one side of the drum, a second bar-pushing member and means for moving the second pushing member along the channel element of the bar loading device;

and control means selectively actuable to laterally tilt both the first pushing member in said retracted position, and the bar loading device, between an aligned and an angularly spaced condition with respect to bar guiding channel of the bar guide device.

8. A bar feeder according to claim 7, wherein said first bar-pushing member is in the form of an elongated pushing rod and wherein said control means comprise a support sleeve for supporting said pushing rod in the retracted position, said support sleeve being tiltable about a rotational axis parallely extending to the longitudinal axis of the drum, and drive means for the pushing rod, said drive means being engageable and disengageble with a rear end of the rod by tilting movement of the support sleeve, in the retracted position of said pushing rod.

* * * * *